(12) United States Patent  (10) Patent No.: US 7,606,329 B2
Yamauchi  (45) Date of Patent: Oct. 20, 2009

(54) DATA RECEIVER ADAPTIVELY OPERABLE TO RECEIVED SIGNAL STRENGTH INDICATION

(75) Inventor: Shigeki Yamauchi, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 455 days.

(21) Appl. No.: 11/033,448

(22) Filed: Jan. 12, 2005

(65) Prior Publication Data

US 2005/0185737 A1    Aug. 25, 2005

(30) Foreign Application Priority Data

Jan. 16, 2004   (JP)   ............................. 2004-009651
Oct. 8, 2004   (JP)   ............................. 2004-296656

(51) Int. Cl.
    *H03K 9/00*    (2006.01)
(52) U.S. Cl. .................................................. 375/316
(58) Field of Classification Search ................. 375/316, 375/322, 324, 326, 340, 344, 345, 350; 455/39, 455/67.11, 67.13, 296, 226.1, 226.2, 313
    See application file for complete search history.

(56) References Cited

U.S. PATENT DOCUMENTS

| 5,603,113 A * | 2/1997 | De Loe, Jr. ............... 455/234.1 |
| 5,781,570 A * | 7/1998 | Hattori ....................... 714/807 |
| 6,671,331 B1 * | 12/2003 | Sakuma ....................... 375/316 |
| 6,847,628 B1 * | 1/2005 | Sakuma ....................... 370/347 |
| 2004/0132410 A1 * | 7/2004 | Hundal et al. ............ 455/67.13 |
| 2005/0079841 A1 * | 4/2005 | Astrachan et al. ........ 455/226.2 |
| 2006/0154628 A1 * | 7/2006 | Mochizuki .................. 455/134 |

FOREIGN PATENT DOCUMENTS

| JP | 10-163949 | 6/1998 |
| JP | 2000068874 A | 3/2000 |
| JP | 2003-078469 | 3/2003 |
| JP | 2003134027 A | 5/2003 |
| JP | 2003-273796 | 9/2003 |

OTHER PUBLICATIONS

Japanese Office Action "Notification of Reason for Refusal" dated Jul. 28, 2009. Patent Application No. 2004-296656; with Extract English Translation.

* cited by examiner

*Primary Examiner*—Kevin Y Kim
(74) *Attorney, Agent, or Firm*—Studebaker & Brackett PC; Donald R. Studebaker

(57) ABSTRACT

The modem has an RF section developing an RSSI signal and a baseband signal converted from a received signal. A reference voltage output section feeds a reference voltage to a comparator. The comparator outputs, when the RSSI signal is higher in level than the reference voltage, a control signal to the RF section, an A/D converter and a demodulator of a receiver modem. The modem thus provides a data receiver capable of reducing power consumption in the entire system, while maintaining a reliable detection of received signals.

11 Claims, 10 Drawing Sheets

DATA RECEIVER ADAPTIVELY OPERABLE TO RECEIVED SIGNAL STRENGTH INDICATION

BACKGROUND OF THE INVENTION

1. Field of the Invention

The present invention relates to a data receiver, in particular to a data receiver for use in a radio LAN (Local Area Network) system standardized by IEEE (Institute of Electrical and Electronics Engineers) 802.11.

2. Description of the Background Art

Conventionally, some data receivers for use in a radio LAN system employ a method of detecting a received signal on a packet transmitted such that signals received on a transmission path are always inputted into a receiver synchronization circuit for carrying out synchronous detection. Accordingly, the successful detection of signals was merely assumed by establishing synchronization in the receiver synchronization circuit. In addition to that, ways of detecting signals have been proposed in compliance with every situation without errors.

For example, the circuit for detecting receiving timing and burst signal receiver disclosed in Japanese patent laid-open publication No. 2003-78469 aim at eliminating a conventional situation where an interference signal is erroneously received and an essential transmitted signal cannot be received, in order to transmit a highly accurate receiver timing signal. In the disclosed system, a digitalized RSSI (Received Signal Strength Indication) signal is delayed, and a sampled value of a preceding RSSI signal is used as a reference value for calculating the increment of the RSSI signal to thereafter calculate the increment based on the difference of the sampled value of an RSSI signal successively inputted from the reference value. When the increment exceeds a predetermined threshold, a detection signal is outputted to transmit a receiver timing signal.

Also, a burst signal demodulator disclosed in Japanese patent laid-open publication No. 163949/1998 is intended to automatically follow variation in a line environment without measuring the levels of the electric power of noise, interference and signal on a real line. In the burst signal demodulator disclosed, the demodulator demodulates an input signal only for the period of a burst modulation signal, and provides a UW (Unique Word) detector with demodulated data and a modulated clock. The UW detector deletes the unique word from the modulated data to then output resultant data and demodulated signal as well as to provide a counter with a UW-detected and a UW-undetected signal upon detecting and not detecting a unique word, respectively. From the counter operative with the demodulated clock, a negative-going transition detection signal is delivered to a burst signal detector. The RSSI measurement circuit smoothes an input signal to output a resultant RSSI signal to the burst signal detector. The burst signal detector is responsive to the negative-going transition detection signal, the RSSI signal and a threshold signal outputted from the threshold control, and measures the received power in a guard time to output a frame signal to the demodulator as well as to feed it back to the threshold control. The threshold is set for each guard time period, thereby making the threshold variable to control a detection threshold for the input signal to be an optimum value.

Further, a carrier detecting circuit disclosed in U.S. Pat. No. 6,671,331 to Sakuma is intended to reduce errors in detection and widen a receiver range. The carrier detecting circuit disclosed has an averaging circuit adapted to integrate, for a predetermined period, the level of the electric field received during a guide time period between transmitted and received bursts, and averages an obtained integrated value. To the averaged value, a threshold generator adds a predetermined value to generate a threshold. A comparator compares the received level of the electric field with the threshold to thereby detect a carrier. That substantially prolongs the detection distance, thereby widening a communication area. The carrier detector is synchronized with an analog-to-digital (A/D) converter clock signal, and carries out moving integration on an output value of the received level of the electric field to provide a result from the integration as a value to be compared, which is in turn compared with the threshold value to thereby detect a carrier.

Those three radio LAN systems described above are structured such that receivers can assuredly detect transmitted signals under any environmental condition. However, those receivers are designed without considering power consumption so that they are not efficient in respect of consumed current, because the signal detection utilizing a synchronizing function in a receiver is based on the operations of the entire analog circuitry of the receiver and of an analog-to-digital converter (ADC) in the receiver, an AGC (Automatic Gain Control) circuit in the signal processor and the receiver synchronization circuit. For a mobile phone terminal equipped with a receiver and powered by a battery, for example, power consumption in the unit is particularly required to be reduced as low as possible.

The digital synchronous radio system disclosed in Japanese patent laid-open publication No. 2003-273796 has a structure in which, for the purpose of reducing electric power consumption during a standby period for which data are neither transmitted nor received between a parent station and its member stations, the power supply to a transmitter of the parent station is suspended by a first controller during a period for which signals are neither transmitted nor received, and the first controller is responsive to a detection of an RSSI voltage having a level higher than a predetermined level or of predetermined demodulated data to thereby determine a call origination to turn on the transmitter in response. The system disclosed in the Japanese publication focuses attention on reduction of electric power consumption only in the transmitter and not in the receiver. Accordingly, in view of reduction of electric power consumption in the whole system, such a way of reduction is not satisfactory.

SUMMARY OF THE INVENTION

It is an object of the present invention to provide a data receiver capable of reducing electric power consumption in the entire system, while maintaining reliable detection of received signals.

A data receiver in accordance with the present invention is characterized by comprising: a frequency converter for receiving a radio signal to produce an RSSI (Received Signal Strength Indication) signal indicating a received strength indication level of the radio signal, and converting the radio signal received to a baseband signal; a digitizer for digitalizing the baseband signal to output data; a receiver demodulator for demodulating the data; and a comparator for comparing a level of the RSSI signal with a reference level to output a control signal for controlling operation according to a result from comparison to the frequency converter, the digitizer and the receiver demodulator; the receiver demodulator being operative in response to the control signal to demodulate the data.

Further in accordance with the present invention, a data receiver comprises: a frequency converter for receiving a radio signal to produce an RSSI (Received Signal Strength Indication) signal indicating a received strength indication level of the radio signal, and converting the radio signal received to a baseband signal; a digitizer for digitalizing the baseband signal to output data; a receiver demodulator for demodulating the data to output a demodulated signal; a comparator for comparing a level of the RSSI signal with a reference level to output a control signal for controlling operation according to a result from comparison to the frequency converter, the digitizer and the receiver demodulator; and an adjusting circuit operative in response to the demodulated signal for adjusting the reference level.

In the data receiver in accordance with the present invention, the frequency converter produces the RSSI signal and the baseband signal converted from the received signal, and the adjusting circuit feeds a reference level to the comparator, which outputs, when the level of the RSSI signal is higher than the reference level, the control signal to the frequency converter, the digitizer and the demodulator, thereby avoiding useless operation to reduce electric power consumption in the system.

Further, the data receiver in accordance with the invention is characterized by comprising a frequency converter for receiving a radio signal to produce an RSSI (Received Signal Strength Indication) signal indicating a received strength indication level of the radio signal, and converting the radio signal received to a baseband signal; a digitizer for digitalizing the baseband signal to output data; a receiver demodulator for demodulating the data to output a demodulated signal; an averaging circuit for digitalizing the RSSI signal and averaging the RSSI signal digitalized with each of a plurality of averaging parameters to produce a corresponding plurality of average data; and a signal detector for comparing each of the plurality of average data with a predetermined reference level in response to an error detection, and producing a control signal for operation according to a result of comparison to the frequency converter, the digitizer and the receiver demodulator.

In the data receiver in accordance with the present invention, the frequency converter produces the RSSI signal and the baseband signal converted from the received signal, and the averaging circuit digitalizes the RSSI signal and averages the RSSI data to feed the latter to the signal detector. The signal detector outputs, when the level of the RSSI data supplied is higher than the reference level, the control signal to the frequency converter, the digitizer and the demodulator, thereby avoiding useless operation to make it possible to reduce electric power consumption in the system as well as to detect correct signals.

Still further, in accordance with the invention, a data receiver is characterized by comprising: a frequency converter for receiving a radio signal to produce an RSSI (Received Signal Strength Indication) signal indicating a received strength indication level of the radio signal, and converting the radio signal received to a baseband signal; a first converter for digitalizing the baseband signal to output digitized baseband data; a second converter for digitalizing the RSSI signal produced to output RSSI data; a receiver demodulator for demodulating the data to output a demodulated signal; a first monitoring circuit for demodulating the digitized baseband data, and monitoring a favorable peripheral environment on a basis of the digitized baseband data; a second monitoring circuit for monitoring deterioration of the peripheral environment on a basis of the RSSI data to control operations of the frequency converter, the first converter and the first monitoring circuit; and an output control circuit operative in response to the first and second monitoring circuits for producing a permission signal of operation to control operation of the first and second monitoring circuits.

In the data receiver in accordance with the present invention, the frequency converter produces the RSSI signal and the baseband signal converted from the received signal, and the first and second converters digitalize the baseband signal and the RSSIO signal and supply the signals to the first and second monitoring circuits, respectively. The output control circuit controls operation on the basis of information fed from the first and second monitoring circuits, thereby making it possible to reduce electric power consumption in the entire system as well as to prevent operation in detection of a received signal from being deteriorated.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
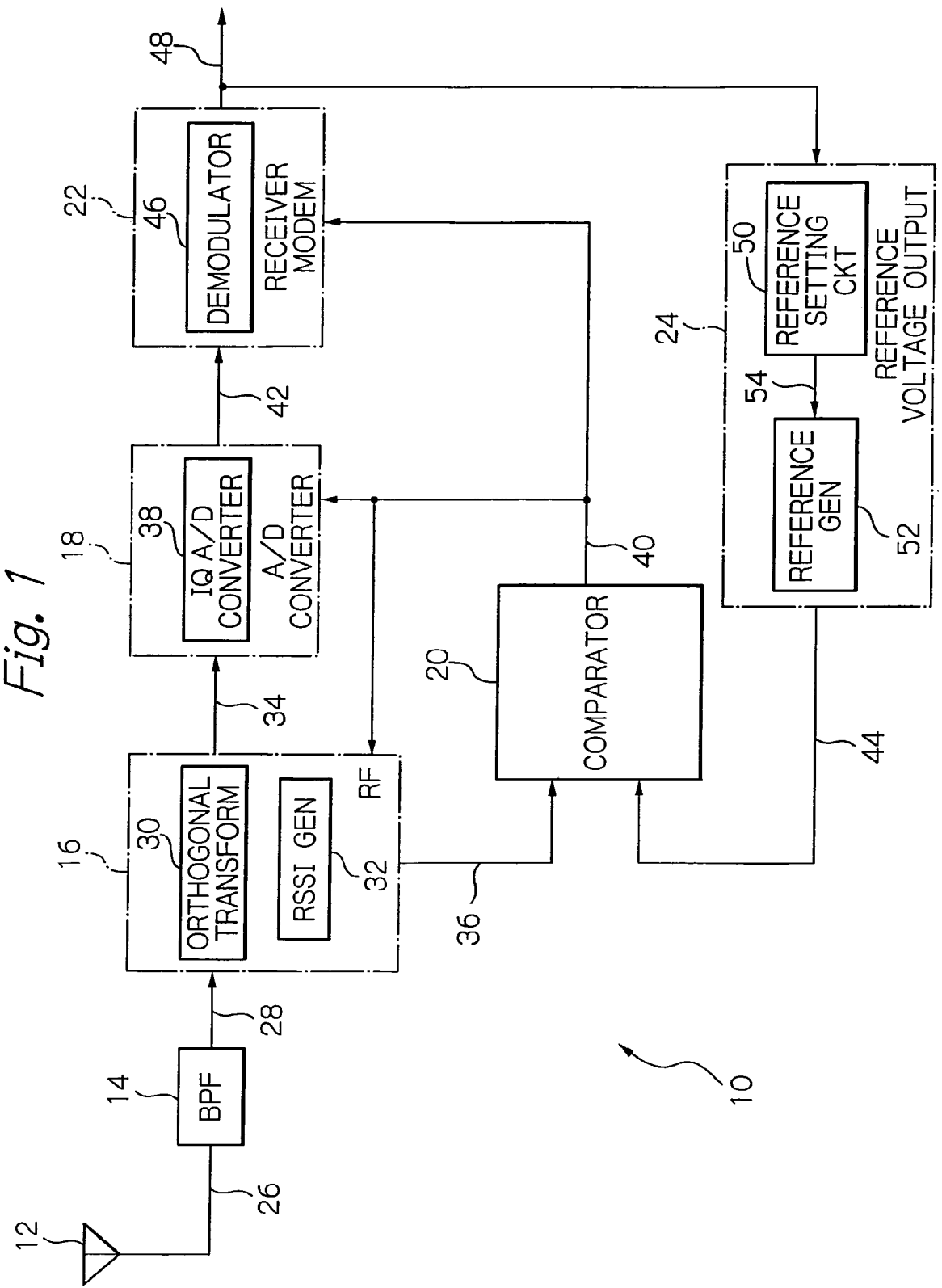
FIG. 1 is a block diagram showing a schematic configuration of a preferred embodiment of a modem to which the data receiver in accordance with the invention is applied.

In the following, embodiments of the data receiver in accordance with the present invention will be described with reference to the accompanying drawings. The embodiments are directed to an application where the data receiver of the invention is applied to a modem 10. As shown in FIG. 1, the modem 10 includes an antenna 12, a band-pass filter (BPF) 14, a radio frequency (RF) section 16, an analog-to-digital (A/D) converter 18, a comparator 20, a receiver modem 22 and a reference voltage output section 24, which are interconnected as illustrated. Parts not directly related to understanding the invention are omitted from the drawings and description. For example, since the modem 10 shown in FIG. 1 will be basically described in terms of its receiver function, to which the invention is directed, a description will be omitted on the configuration directed to its transmitter function.

The antenna 12 has the function of catching incoming radio waves and feeding a received signal 26 to the RF section 16 over a fixed gain transmission path. The antenna 12 is also adapted for transmitting a signal provided from the RF section 16 in the form of radio waves. The band-pass filter 14 has its pass-band limited to permit an available frequency channel of the received signal to pass. The band-pass filter 14 feeds a received signal 28 having its band thus limited to the RF section 16.

The RF section 16 includes an orthogonal transform circuit 30 and an RSSI (Received Signal Strength Indication) generator 32 to serve as a frequency converter. As for receiver function, the RF section 16 has the function of reducing changes in level of the received signal 28 by its automatic gain control (AGC), and is controlled in response to the output of the comparator 20, which will be described later. The orthogonal transform circuit 30 carries out orthogonal detection on the received signal 28 with its level adjusted to orthogonal-transform the signal. In the description given below, signals are denoted with reference numerals for connections on which they appear. The orthogonal transform circuit 30 outputs a signal 34 containing baseband I (In-phase) and Q (Quadrature) components resultant from the orthogonal transform to the A/D converter 18. The RSSI generator 32 has the function of producing an RSSI signal on the basis of the received signal 38 with its level adjusted. The RSSI generator 32 outputs a generated RSSI signal 36 to the comparator 20.

The A/D converter 18 includes an IQ A/D converter 38. The IQ A/D converter 38 includes I and Q A/D converters, not specifically shown in the figure. The IQ A/D converter 38 is adapted to convert the signal 34 into a corresponding digital signal in response to an enable signal 40 fed by the comparator 20. The IQ A/D converter 38 outputs the data thus converted in the form of digital data to the receiver modem 22.

The comparator 20 is adapted for comparing in level the RSSI signal 36 received on its one input port with a reference voltage signal 44 received from the reference voltage output section 24 on its other input port, and has a hysteresis function. The comparator 20 is, as a level comparing function, adapted, for example, to output the enable signal 40 when the RSSI signal is higher in level than the reference voltage signal 44, and otherwise no signal. The comparator 20 feeds the enable signal 40 not only to the above-described A/D converter 18 but also to the receiver modem 22 to control operations of the A/D converter 18 and the receiver modem 22, respectively.

The receiver modem 22 includes a demodulator 46. The demodulator has the function of demodulating the data 42 to be fed thereto. The receiver modem 22 outputs the demodulated data 48 to a signal processor, not shown in the figure, provided in a successive stage, as well as feeds it to the reference voltage output section 24.

The reference voltage output section 24 includes a reference setting circuit 50 and a reference generator 52, which are interconnected as shown. The reference setting circuit 50 has the function of adjusting the reference voltage in response to an error involved in the data 48 fed from the receiver modem 22 to set it to a new voltage level. The reference setting circuit 50 outputs a newly set digital value 54 to the reference generator 52. The reference generator 52 has the function, i.e. a digital-to-analog (D/A) converting function of converting the fed digital value 54 into a corresponding analog signal 44. The reference generator 52 feeds the generated reference voltage signal 44 to the other input port of the comparator 20.

The adjustment of the reference voltage in that way controls an erroneous detection caused by interfering wave signals. As the result, the modem 10 prevents operation due to such an erroneous detection to thereby make it possible to reduce electric power consumption.

Subsequently, an operation of the modem 10 will briefly be described. The received signal 26 caught by the antenna 12 is fed to the RF section 16 through the band-pass filter 14. The RF section 16 outputs the signal 34 of baseband IQ components and the RSSI signal 36 to the A/D converter 18 and the one input port of the comparator 20, respectively. Fed to the other input port of the comparator is the reference voltage signal 44.

When the RSSI signal is higher in level than the reference voltage signal 44, as regarding as an intended received signal existing there, the comparator 20 feeds the enable signal 40 to the A/D converter 16 and the receiver modem 22 to start up the A/D converter 16 and the receiver modem 22. By contrast, when there is no intended received signal, the modem 10 does not operate, useless consumption of electricity being thus avoided. Only when an intended received signal exists, it is demodulated by the receiver modem 22 and the demodulated data 48 is fed to the reference voltage output section 24. The reference voltage output section 24 adjusts the data on the basis of a data error outputted from the receiver modem 22, and then feeds it as a reference voltage to the comparator 20. This adjustment allows control of erroneous detection caused by interference wave signals, resulting in reduction of electric power consumed in the apparatus. Also, it makes it possible to control, until the comparator 20 responds to output the enable signal 40, the electric power for the automatic gain control in the RF section 16 to its minimum level, thereby reducing power consumption.

In the modem 10 arranged in the way described above, the RF section 16 produces the RSSI signal 36 and the baseband signal converted from the received signal 34, and the reference voltage output section 24 feeds the comparator 20 with the reference voltage value 44. The comparator 20 in turn outputs the control signal 40 to the RF section 16, the A/D converter 18 and the demodulator 46 of the receiver modem 22, when the level of the RSSI signal 36 is higher than the reference voltage value 44, thereby making it possible to avoid a useless operation as well as to reduce electric power consumption in the system.

Subsequently, an alternative embodiment of the modem 10 will be described to which applied is the data receiver in accordance with the invention. In the following description on the embodiments, components similar to those of the embodiment described above are denoted with the same reference numerals to omit repetitive description thereof to avoid intricate.

Figure 2:
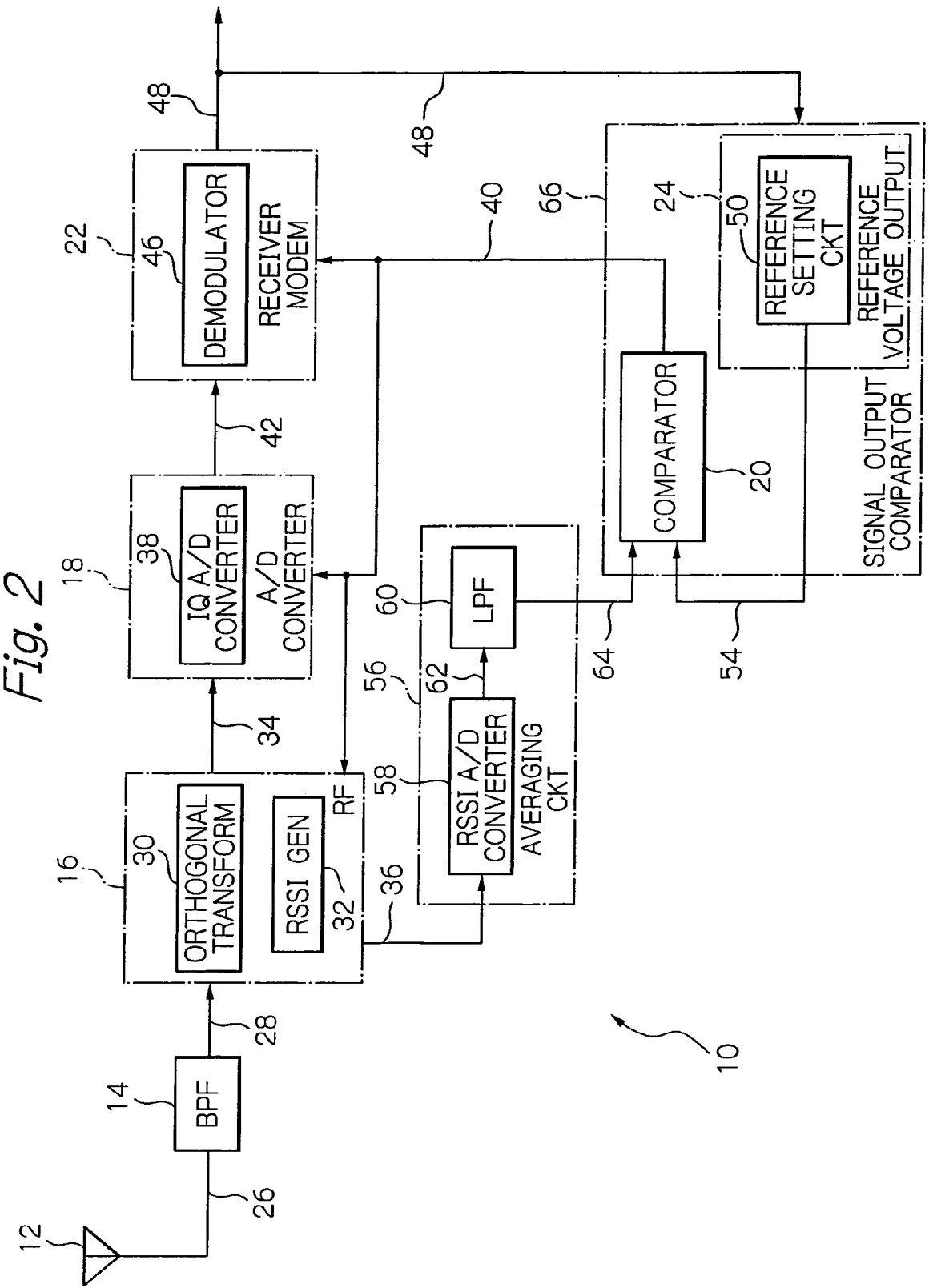
FIG. 2 is a block diagram, like FIG. 1, showing a schematic configuration of an alternative preferred embodiment of a modem to which the data receiver in accordance with the invention is applied.

The modem 10 in accordance with the alternative embodiment, as shown in FIG. 2, includes an averaging circuit 56 in addition to the components included in the foregoing embodiment. The averaging circuit 56 includes an RSSI A/D converter 58 and a low-pass filter (LPF) 60. The RSSI converter 58 has the function of digitalizing the RSSI signal 36 fed thereto. The RSSI A/D converter 58 feeds the digitalized RSSI data to the low-pass filter 60. The low-pass filter 60 is preferably implemented by an infinite impulse response (IIR) or a moving average type of digital filter. The averaging circuit 56 stably low-pass filters out the digitalized RSSI data 62 to then feed it as RSSI data 64 to one input port of the comparator 20. Also, fed to the other input port of the comparator 20 is a digital value 54 from the reference setting circuit 50 of the reference voltage output section 24.

The comparator 20 in the embodiment may be the same as with the foregoing embodiment except that it is adapted to receive and deal with the digital data input thereto. The reference voltage output section 24 suffices to have the reference setting circuit 50 adapted to the form of signal input to the comparator 20. Also, the combination of the comparator 20 and the reference voltage output section 24 may function as a signal output comparator 66.

Operation of the embodiment will be described in brief. The RSSI signal 36 is inputted from the RF section 16 to the RSSI A/D converter 58, and outputs the RSSI data 62 to the low-pass filter 60. The low-pass filter 60 low-pass filters out the RSSI data 62 in digital and feeds resultant data to the one input port 64 of the comparator 20. If the RSSI signal 36 is fed to the comparator 20 in the form of analog signal as with the foregoing embodiment, an analog low-pass filter, not shown, should be connected to the input stage of the comparator 20 to heighten the accuracy of the RSSI signal. However, use of the analog low-pass filter causes a fluctuation or the like in the transient characteristic of the RSSI signal. The low-pass filter 60 in the alternative embodiment is implemented in the from of digital circuitry to permit the fluctuation of the transient characteristic to be controlled as well as the accuracy of the RSSI signal to be increased. The low-pass filter 60 may be implemented as an analog filter which is configured to be less affected in its transient characteristic.

The comparator 20 is adapted to compare the RSSI data 64 with the reference voltage value 54 set, which is a digital value. The comparator 20 outputs, when the RSSI data 64 is detected higher in level than the reference voltage value 54, the enable signal 40 to the RF section 16, the A/D converter 18 and the receiver modem 22 to operate them, whereas it otherwise stops their operation. That makes it possible to reduce electric power consumption as well as to operate the modem 10 with favorable accuracy in response to a highly accurate RSSI signal.

The modem 10 has the averaging circuit 56 which is arranged between the RF section 16 and the comparator 20, and averages the RSSI signal 36 to thereby increase the accuracy of the RSSI signal.

In general, the RF section 16, which is constituted of analog components, involves its inherent circuit performance which is higher in noise level with a transmission system handling RSSI signals than a transmission system handling data. This means that, when a noise exists, a signal having its level exceeding a predetermined level is determined as an RSSI signal. The circuit for detecting receiving timing disclosed in Japanese patent laid-open publication No. 2003-78469 described earlier has a delay device adapted to receive an input signal to detect a carrier-to-noise (C/N) ratio for the input signal and compare the C/N ration with an expected value to provide a reception timing signal. When an input signal from which the C/N ratio has been detected higher than a predetermined level is dealt with as an expected signal, an input signal is used from which a noise has been removed corresponding to its offset. The portion thus lowered in level of the input signal causes a signal level from which the signal cannot be detected. On the contrary, the modem 10 of the alternative embodiment raises the level of the signal 36 by the averaging circuit 56 and adjusts the reference voltage value 54 accordingly to thereby prevent the generation of a signal level at which the signal cannot be detected.

Figure 3:
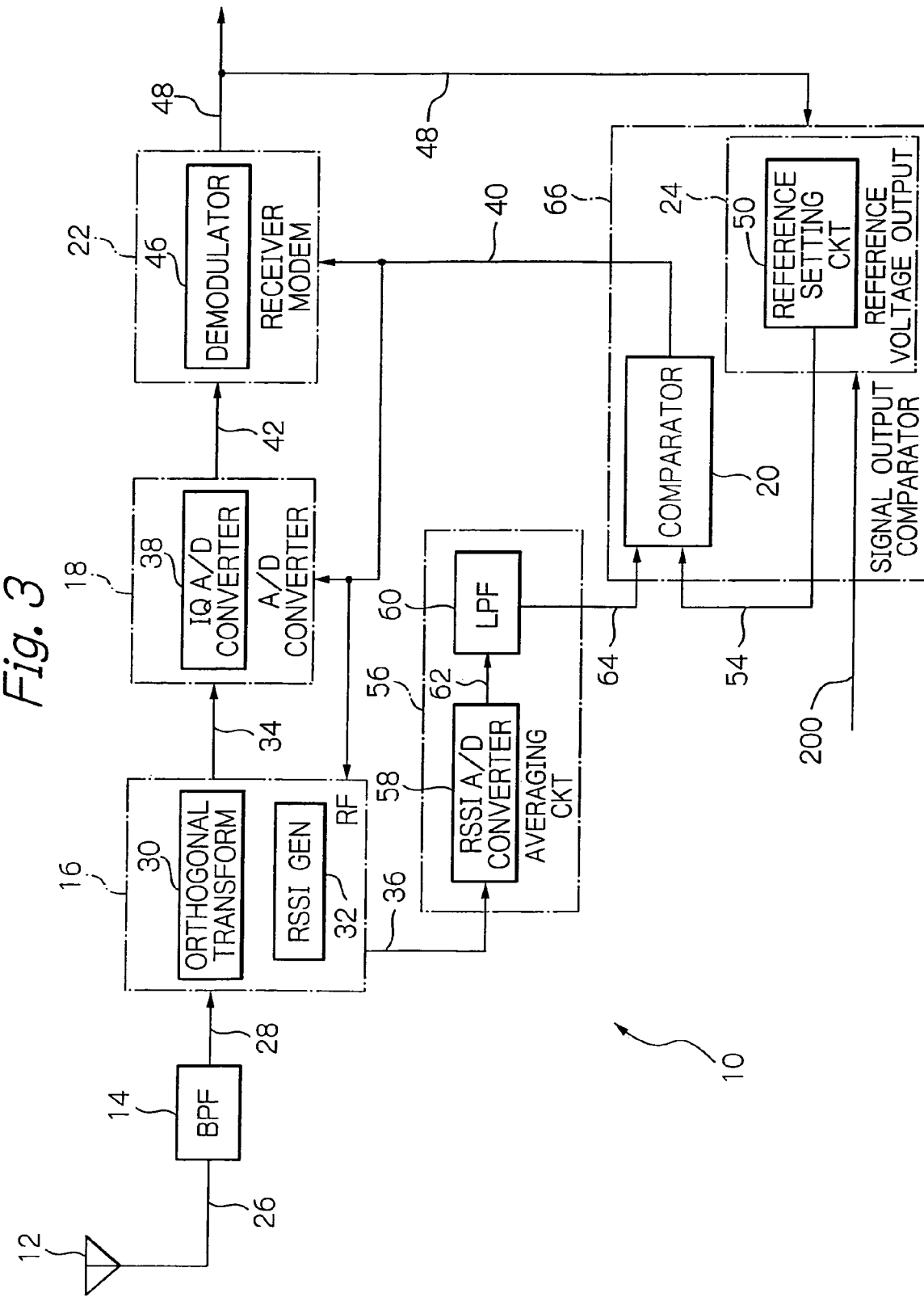
FIG. 3 is a block diagram, like FIG. 1, showing a schematic configuration of a still alternative preferred embodiment of a modem to which the data receiver of the invention is applied.

Now with reference to FIG. 3, another alternative embodiment of the modem 10 will be described to which the data receiver is applied in accordance with the invention. The instant embodiment comprises the components same as those of the embodiment shown in FIG. 2 except that the reference setting circuit 50 has an operating function, not specifically shown, of generating the reference voltage value 54 as a new RSSI threshold value upon a detection of an error in the demodulated data 48. The reference setting circuit 50 is adapted to receive a set value 200 for comparison from an upper layer. The reference setting circuit 50 feeds the altered reference level 54 to the comparator 20. The comparator 20 outputs the enable signal 40 on the basis of the comparison result.

Next, the operation of the reference setting circuit 50 will be described which is a characteristic of this embodiment. In the reference setting circuit 50, there are set a minimum and a maximum limit value for an RSSI threshold value, and a correction value and a fine adjustment value associated with erroneous detection. Specific values therefor are the minimum limit value MIN=10 and the maximum limit value MAX=40 for the RSSI threshold value, and the correction value $\alpha=10$ and the fine adjustment value $\beta=2$ for erroneous detection. In the embodiment, the operation is executed at the interval of two seconds. The operation is activated in response to a count in a counter, not shown, built in the modem 10.

Figure 4:
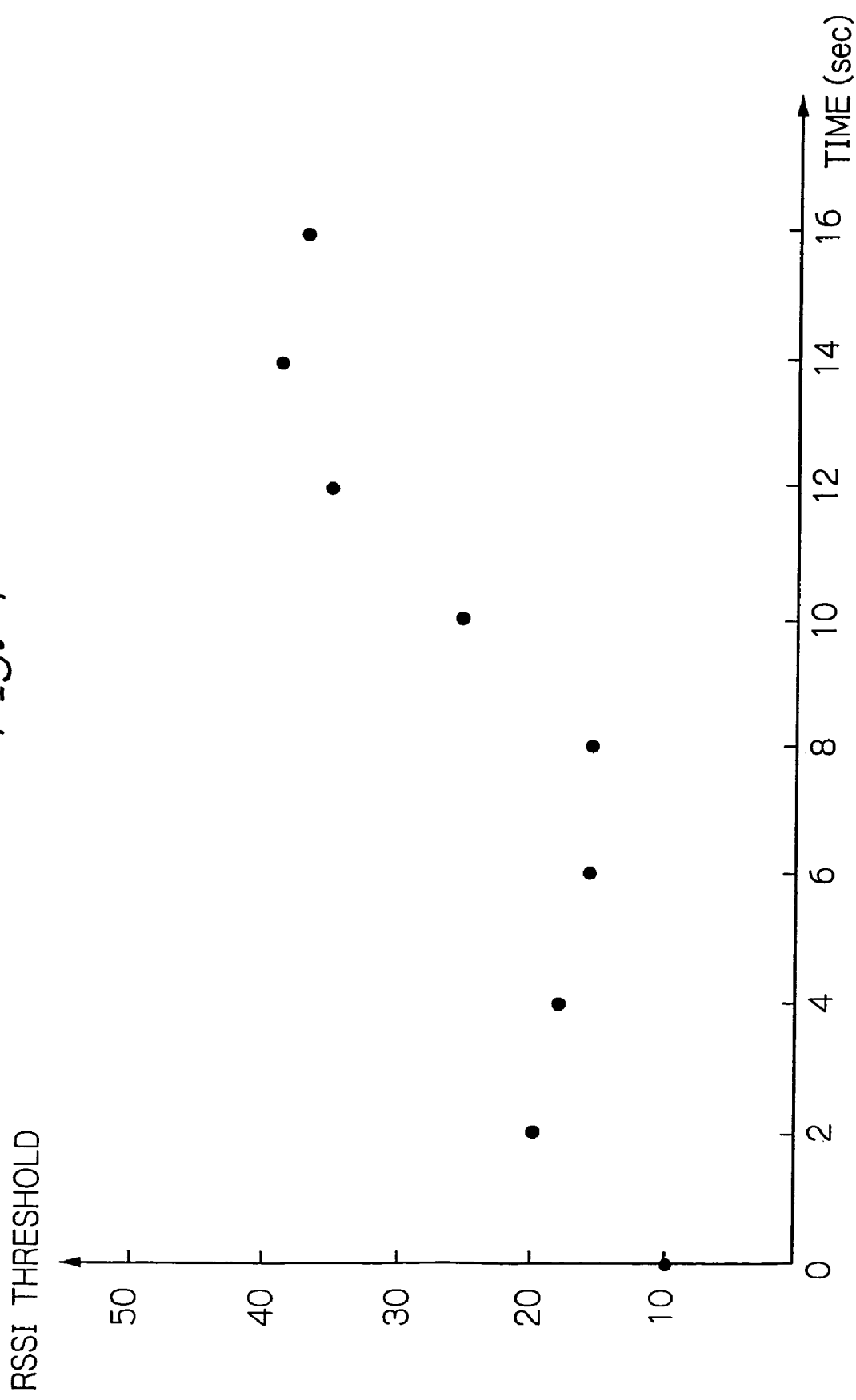
FIG. 4 plots changes in an RSSI value when the modem shown in FIG. 3 operates.

Particularly, with reference to FIG. 4 exemplified, the time point at which the modem 10 is turned on is regarded as zero, i.e. the start of the operation, or the elapse of two seconds starts the operation. At this instance, the reference setting circuit 50 determines whether or not the current RSSI threshold value is larger than the minimum value. When the answer is positive, the reference setting circuit 50 subtracts the set value 200 for comparison and the fine adjustment value $\beta$ from the current RSSI threshold value to obtain a resultant value to set the latter as a new RSSI threshold value. The reference setting circuit 50 then determines whether or not the generated RSSI threshold value is smaller than the minimum limit value MIN. When the answer is positive, the RSSI threshold value is set to a value equal to the minimum limit value MIN.

Further, a count other than the initialized value causes the reference setting circuit 50 to renew the RSSI threshold value on the basis of the existence of an error. When an error is detected, judgment is made on whether or not the RSSI threshold value is smaller than the maximum limit value MAX. When the answer is positive, the set value 200 for comparison is subtracted from the current RSSI threshold value, and further the correction value $\alpha$ is added to obtain a new RSSI threshold value. Then, judgment is made on whether or not the RSSI threshold value thus generated is larger than the maximum limit value MAX. When the answer is positive, the RISSI threshold value is set to a value equal to the maximum limit value MAX. The modem 10 initializes the RSSI threshold value when the channel frequency is changed.

When the RSSI value is set in this way during the initialization, the RSSI value is equal to the minimum limit value "10", in this example. Two seconds later, if a signal as expected is not demodulated, the set value 200 for comparison becomes equal to the RSSI threshold value "20" which is resultant from addition of zero and $\alpha$ in dependent upon the error detection. At the further elapse of two seconds, i.e. the elapse of four seconds, the RSSI threshold value is set to be "18", in this example, by deduction from the comparison set value 200 by zero and the adjustment value $\beta$. Then, six seconds later, the RSSI threshold value is set to be "16" by deduction of the adjustment value $\beta$ only. After the following eight seconds, if no error is detected in this example, then the RSSI threshold value "16" is held, thus regarding as a successful expected demodulation.

After ten, twelve and fourteen seconds elapse, the correction value $\alpha$ is added to the RSSI threshold value at each time point accordingly to an error detected. Particularly, when fourteen seconds elapse, in this example, the RSSI threshold value, since a calculated value exceeds the maximum limit, is controlled to be the maximum limit value MAX. After sixteen seconds, the comparison set value 200 is received in this example to present the result from reduction accordingly.

By varying the RSSI threshold value according to the result of the demodulation, the system operates with an appropriate RSSI value, thereby making it possible to prevent the system from operating uselessly and to reduce electric power consumption.

In the signal output comparator 6 including the reference voltage output section 24, the reference setting circuit 50 calculates the difference of the currently set RSSI threshold value from the comparison set value 200 to be supplied, and operates the calculated value on the basis of the signal 48 fed from the demodulator 46 to generate a new SSI threshold value to thereby set a proper RSSI threshold value. That can carry out an effective processing of reception and demodulation when intermittently operated. It is thereby possible to control useless operation so as to reduce electric power consumption.

Figure 5:
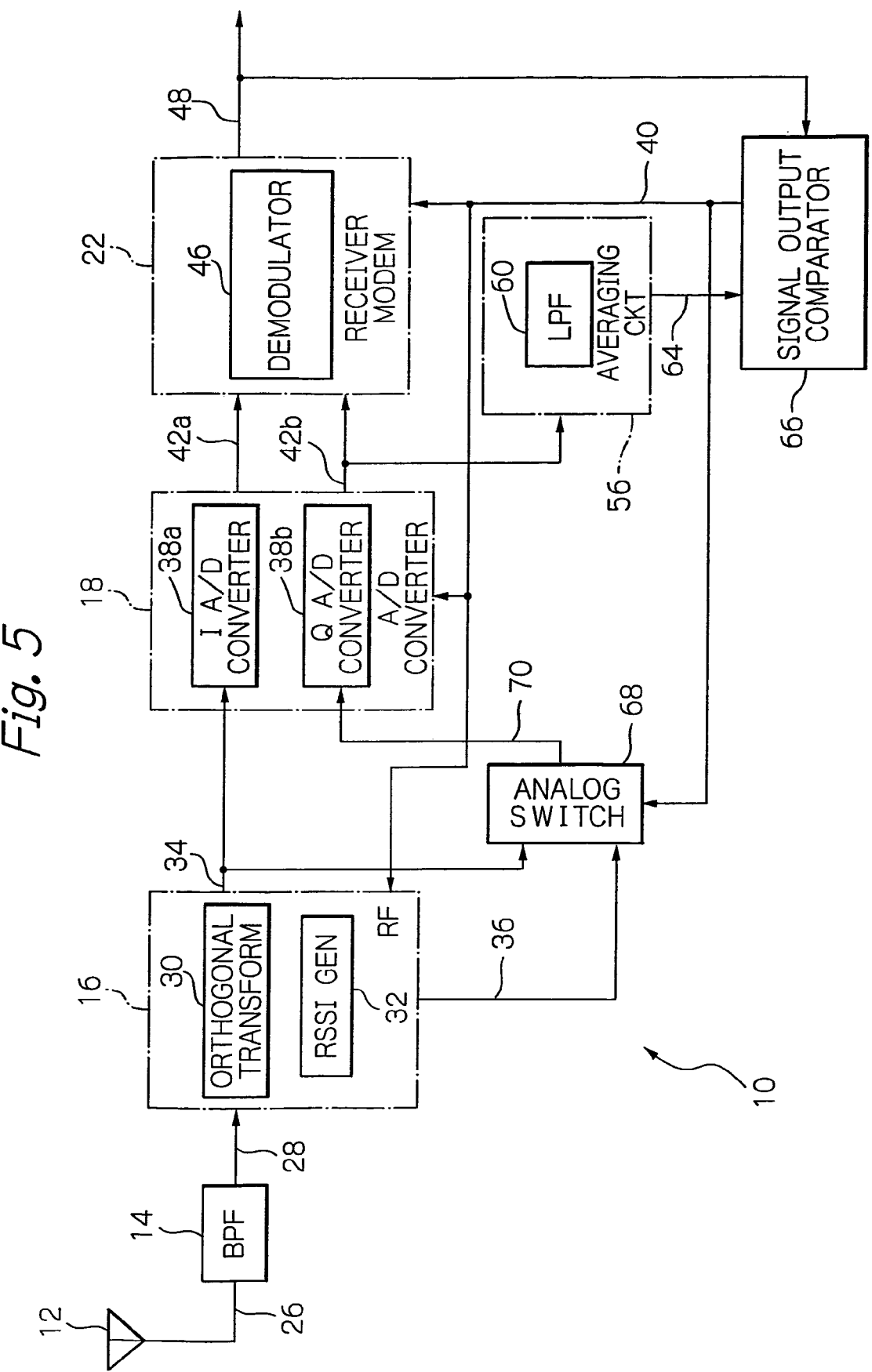
FIG. 5 is a block diagram, like FIG. 1, showing a schematic configuration of a still other alternative embodiment of a modem to which the data receiver of the invention is applied.

Well, with reference to FIG. 5, another alternative embodiment of the modem 10 will be described to which the data receiver is applied in accordance with the invention. The illustrative embodiment is the same as shown in FIG. 2 except that the embodiment shown in FIG. 5 has an analog switch 68 added. The analog switch 68 in FIG. 5 is adapted to receive the signal 34 and the RSSI signal 36, and connect and output an output signal 70 to a Q A/D converter 38*b* in the A/D converter 18 to function as a selector. The analog switch 68 switches the signal 34 from the RSSI signal 36 inputted in response to the enable signal 40 supplied thereto. The A/D converter 18 includes an I A/D converter 38*a* and the Q A/D converter 38*b*, which are interconnected as shown. The I A/D converter 38*a* and the Q A/D converter 38*b* are adapted to digitalize the input signal 34 into data 42*a* and 42*b* deliver the data 42*a* and 42*b* to the receiver modem 22, and the data 42*b* to the averaging circuit 56.

By the arrangement structured as described, the Q A/D converter 38*b* can, when supplied with the signal 70 coming from the RSSI signal 36, function as the RSSI A/D converter 58, FIG. 2. Thus, one and the same A/D converter 38*b* can share the function of the A/D converter 58. The embodiment utilizes the Q A/D converter 38*b* in common. The invention is not limited thereto, but the other I A/D converter 38*a* may alternatively be utilized to be interconnected as intended. Also, the averaging circuit 56 may be adapted to simply comprise the low-pass filter 60.

Operation of the modem 10 in accordance with the embodiment will be described only for the essential points. When the system is configured to use the RSSI signal 36 for detecting only the top of an intended signal, the RSSI signal 36, when detected, becomes disused. The disuse is determined by the signal output comparator 66 having the function of detecting an intended signal. The signal output comparator 66 issues the enable signal 40, in response to which the analog switch 68 switches from the RSSI signal 36 to the signal 34. The arrangement described above also simplifies the configuration as well as reduces electric power consumption.

The modem 10 has the analog switch 68 arranged between the RF section 16 and the A/D converter 18. The analog switch 68 feeds the generated RSSI signal 36 to the A/D converter 18. The averaging circuit 56 averages the output from the A/D converter 18 into the RSSI data 42*b*. The comparator 20 feeds the enable signal 40 to the analog switch 68 to switch the latter to select the received signal 34 obtained by the baseband converting function. The receiver modem 22 outputs the data 48 demodulated. That structure makes it possible to eliminate the RSSI A/D converter 58.

Figure 6:
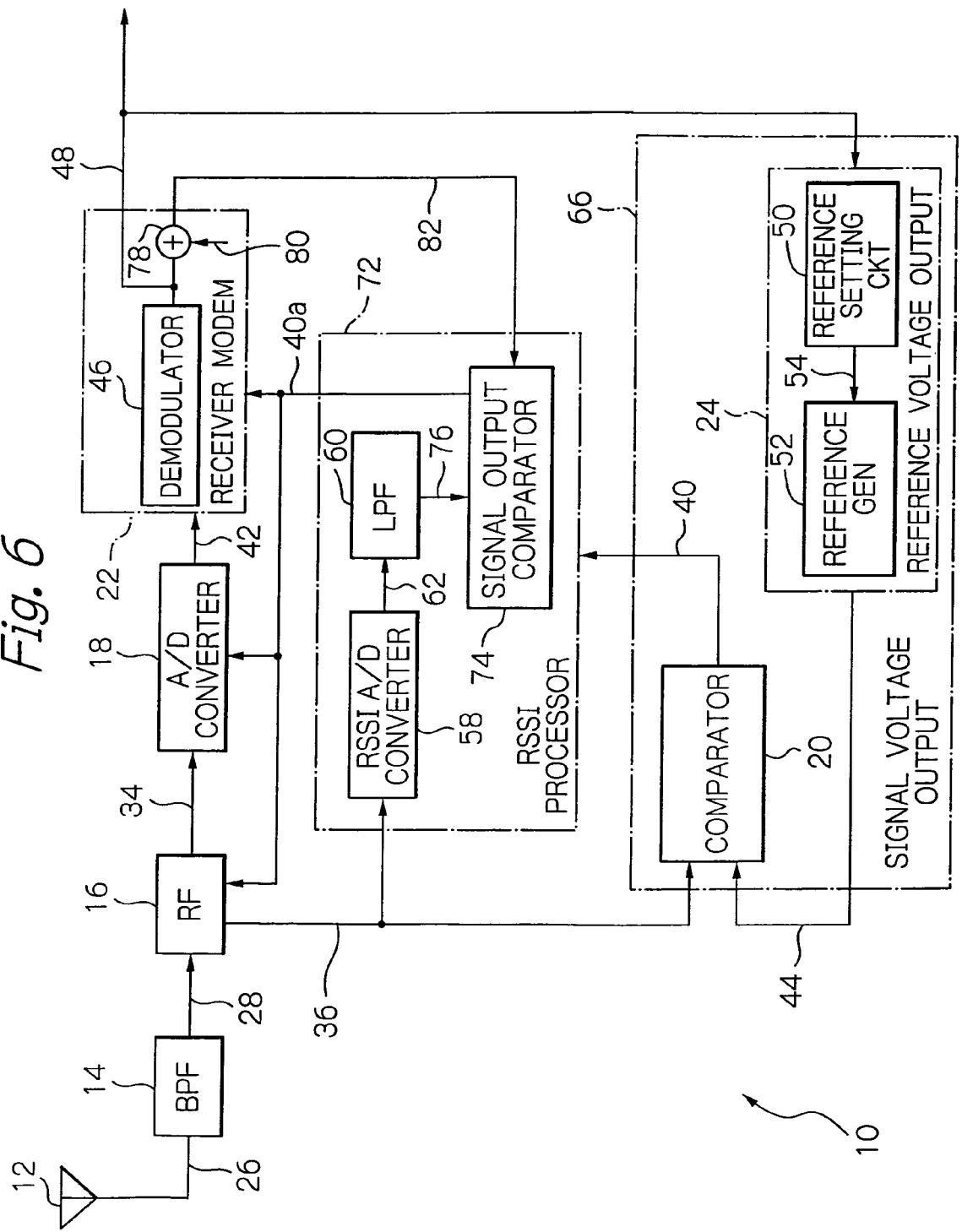
FIG. 6 is a block diagram, like FIG. 1, showing a schematic configuration of a further alternative embodiment of a modem to which the data receiver of the invention is applied.

Further referring to FIG. 6 now, a still alternative embodiment of the modem 10 will be described to which the data receiver is applied in accordance with the invention. The instant alternative embodiment is the same as the embodiment shown in FIG except that the former has an RSSI processor 72 arranged. The RSSI processor 72 in FIG. 6 includes an RSSI A/D converter 58, a low-pass filter 60 and a signal output comparator 74, which are interconnected as illustrated. The signal output comparator 74 may be of the structure similar to that of the signal voltage output section 66 described with reference to FIG. 2. The signal output comparator 76 is fed from the low-pass filter 60 with RSSI data 76 to be compared. The signal output comparator 74 has the function of comparing the RSSI data 76 with a reference value, and operates in response to the enable signal 40 outputted from the signal voltage output section 66. The receiver modem 22 includes a demodulator 46 and an adder 78 interconnected as depicted. Specifically, the demodulator 46 develops demodulated data 48, which are also inputted to the adder 78 and added to a predetermined value 80.

Now, it is needless to say that the predetermined value 80 is set to a value causing the signal output comparator 74 not to easily operate, compared with the case of being operative in response to the control signal 40 output from the signal voltage output section 66. The adder 78 produces from the data 48 data 82 including a value making operation more difficult to feed the signal output comparator 74 with the data 82. The signal output comparator 74 receives the data 82, and compares it with a reference voltage value, which is set to a value higher than the reference voltage value 54. The signal output comparator 74 produces, when being fed with the RSSI signal 36 higher than the set reference value, an enable signal 40*a* to the RF section 16, the A/D converter 18 and the receiver modem 22. The RSSI processor 72 consumes much electric power, but is characterized by an accuracy higher than that of the signal output comparator 66.

In operation, the modem 10 of the alternative embodiment operates, at its first stage, the RSSI processor 72 by the signal voltage output section 66. At the second stage, the RSSI processor 72 controls, when the RSSI data 76 are larger than the data 82, the operation of the RF section 16, A/D converter 18 and receiver modem 22 with the enable signal 40*a*. More specifically, at the first stage, the RSSI signal 36 is fed to the comparator 20 as an intended signal to determine whether or not it is larger than the reference voltage value or the data 54. Accordingly, the RSSI processor 72 stops its operation until the comparator 20 detects an intended signal of which the level is higher than the reference voltage value 54. When the comparator 20 has detected an intended signal having such a level, it outputs the enable signal 40 to the RSSI processor 72 to operate the latter.

The RSSI processor 72 is operated so as to increase the detection accuracy of the RSSI signal. The RSSI processor 72 outputs the enable signal 40*a* only when the RSSI data 76 is detected which has its signal level higher than the intended signal level. Only during the period of feeding the enable signal 40*a*, the receiver modem 22 and other circuit components are rendered operative.

It is to be noted that electric power consumption in the system is smaller for the operation of only the comparator 20 than for the operation of the RSSI processor 72. However, the signal detection of the comparator 20 is deteriorated in accuracy compared with the signal detection of the RSSI processor 72. Thus, in the embodiment, the signal voltage output section 66 and the RSSI processor 72 are used to advantageously reduce consumption in electric power as well as heighten the accuracy in the signal detection.

In the modem 10, the enable signal 40 is supplied from the comparator 20 to the RSSI processor 72 to control the operation of the processor 72. The adder 78 feeds the data 82 for setting a level higher than the reference level to the RSSI processor 72, which in turn outputs the enable signal 40a to the RF section 116, the A/D converter 18 and the demodulator 464 of the receiver modem 22, thereby making it possible to reduce the power consumption as well as to increase the accuracy in signal detection.

Figure 7:
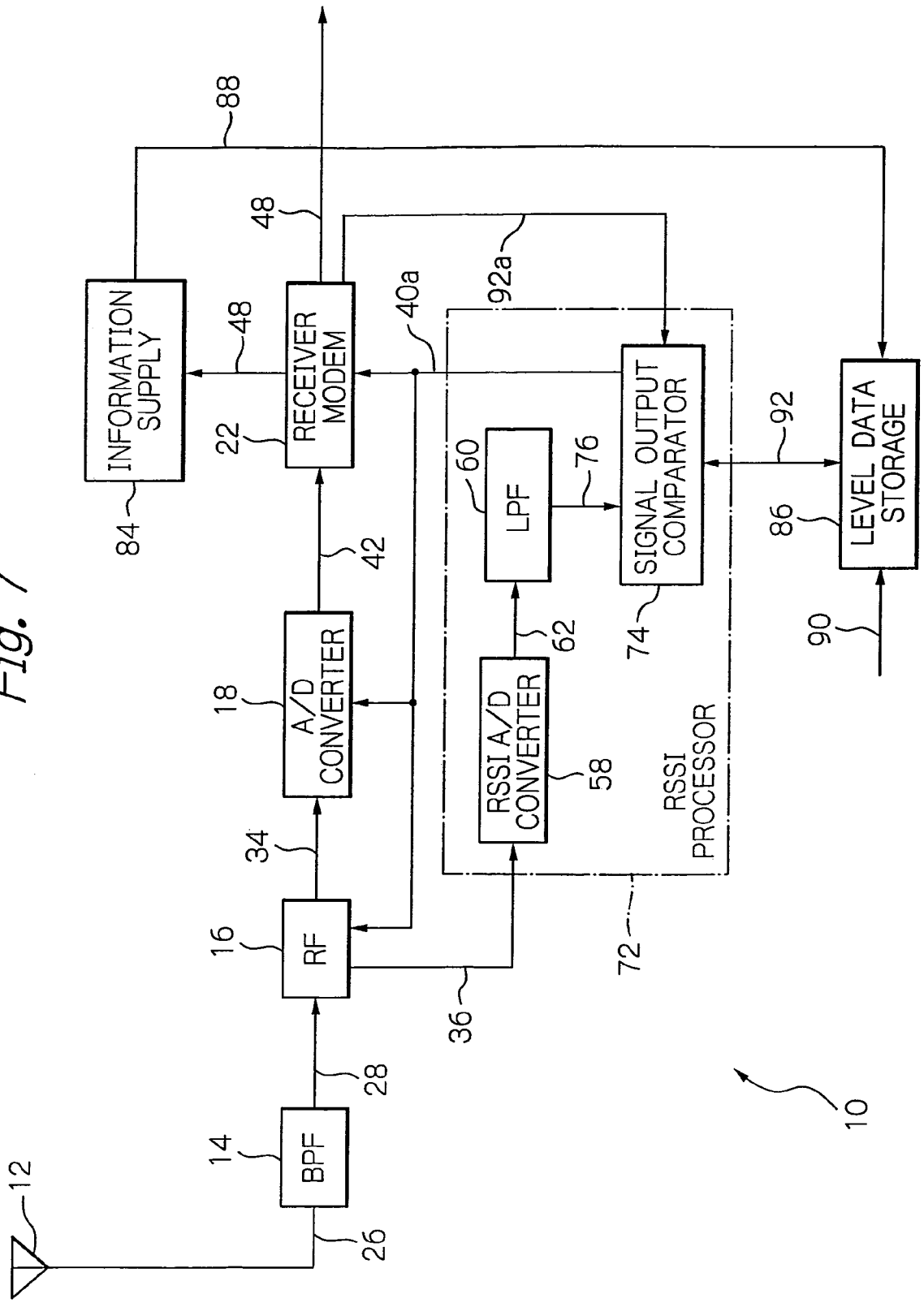
FIG. 7 is a block diagram, like FIG. 1, showing a schematic configuration of a still further alternative embodiment of a modem to which the data receiver of the invention is applied.

Referring to FIG. 7, description will be made on a still further embodiment of the modem 10 to which the data receiver is applied in accordance with the invention. The modem 10 in this embodiment may, as shown in FIG. 7, be the same as the foregoing embodiment shown in FIG. 6 except that the FIG. 7 embodiment includes an information supply section 84 and a level storage section 86, and instead does not have a component corresponding to the signal output comparator 66. In other words, the modem 10 can be regarded as having the information supply section 84 and the level storage section 6 added to the averaging circuit 56. The information supply section 84 has the function to be responsive to a signal destined thereto received in an upper layer under the IEEE 802.11 Standard to generate a timing signal for permitting writing. The information supply section 84 forms a timing signal including "inf_data_end" information, and then feeds the level storage section 86 with an inf_data_end signal 88 accordingly.

The level storage section 86 has the storage function and uses the inf_data_end signal 88 as an enable signal therefor. In response to a control signal 90 provided from a controller, not specifically shown, the level storage section 86 establishes a new RSSI threshold value resultant from an addition of an RSSI threshold value to be stored to a correction value to execute writing and reading. The level storage section 86 holds as a detected RSSI signal level the RSSI data signal 76 fed at the time when the information storage section 84 outputs the info_data_end signal 88. However, the level storage section 86 discards, when fed with the inf_data_end signal 88 not including the inf_data_end information, the RSSI level 92 obtained upon detecting a signal destined thereto. The level storage section 86 reads out the RSSI level data 92 and feeds the data to the signal output comparator 74.

The receiver modem 22 in the embodiment has the function to produce a start-up signal 92a for starting up the signal output comparator 74 according to the peripheral environment. The receiver modem 22 feeds the signal output comparator 74 of the RSSI processor 72 with the start-up signal 92a.

The RSSI processor 72 detects an intended signal for the RSSI signal 36 in response to the start-up signal 92a fed thereto, and feeds the enable signal 40a to the RF section 16, the A/D converter 18 and the receiver modem 22. The signal output comparator 74 has the operating function, and has a fixed threshold value stored beforehand as a reference value.

In the following, the operation of the modem 10 of the present embodiment will be described in brief. The modem 10 is characterized by detecting an intended signal according to the peripheral environment. More specifically, an intended signal is detected by the RSSI processor 72 or the receiver modem 22. The modem 10, upon started up, commences its operation on the receiver modem 22 and operates the RSSI processor 72. Then, the RSSI processor 72 constantly determines the level state of the RSSI signal 36 in order to switch the state of the enable signal 40a.

More specifically, the determination of switching the enable signal 40a proceeds as follows. When the information supply section 84 receives a signal directed thereto, an inf_data_end signal 88 is sent to the level storage section 86 as a level or a correction value for an intended signal. The level storage section 86 holds as a signal level the RSSI data 76 obtained at the time of detecting the RSSI signal 36 and provided when the information supply section 84 outputs the inf_data_end signal 88. The level storage section 86, when not fed with the inf_data_end signal 88, discards the level data that have been obtained so far at the time of signal detection.

The signal output comparator 74 processes the value $x$ stored in the level storage section 86 and the currently received RSSI signal level data $y$ to obtain a result $z=x-y$ by its operating function. The signal output comparator 74 usually compares the result $z$ with the fixed threshold value. Base on the comparison, the signal detection thus operates the modem 10 so as to select either of the signal output comparator 74 and the receiver modem 22.

In the operation described above, the use of the RSSI signal 36 for signal detection may, in noisy environment, cause an erroneous detection. Thus, the modem 10 is adapted to operate the receiver modem 22, depending on the peripheral environment. The circuit operation thus adaptive to the peripheral environment makes it possible to reduce consumption in electric power as well as to maintain the throughput of data.

The modem 10 is adapted to determine whether or not the demodulated data 48 by the information supplying circuit 84 is destined to itself, and outputs the timing signal 88 containing inf_data_end information to the level data storage section 86 when having determined the data destined to itself. The level storage data section 86 stores the averaged RSSI data 76 therein in response to the timing signal 88 supplied. The RSSI data stored in the level storage section 86 are used as a reference value in the signal output comparator 74. Upon the timing signal 88 excluding the inf_data_end information supplied, the stored RSSI data are discarded. When the signal output comparator 74 determines the RSSI data 76 output from the low-pass filter 60 corresponding to the averaging circuit are larger than the reference value, the enable signal 40a is delivered to the RF section 16, the A/D converter 18 and the demodulator 46 of the receiver modem 22, thereby making it possible to reduce the power consumption as well as to maintain the throughput of data.

Figure 8:
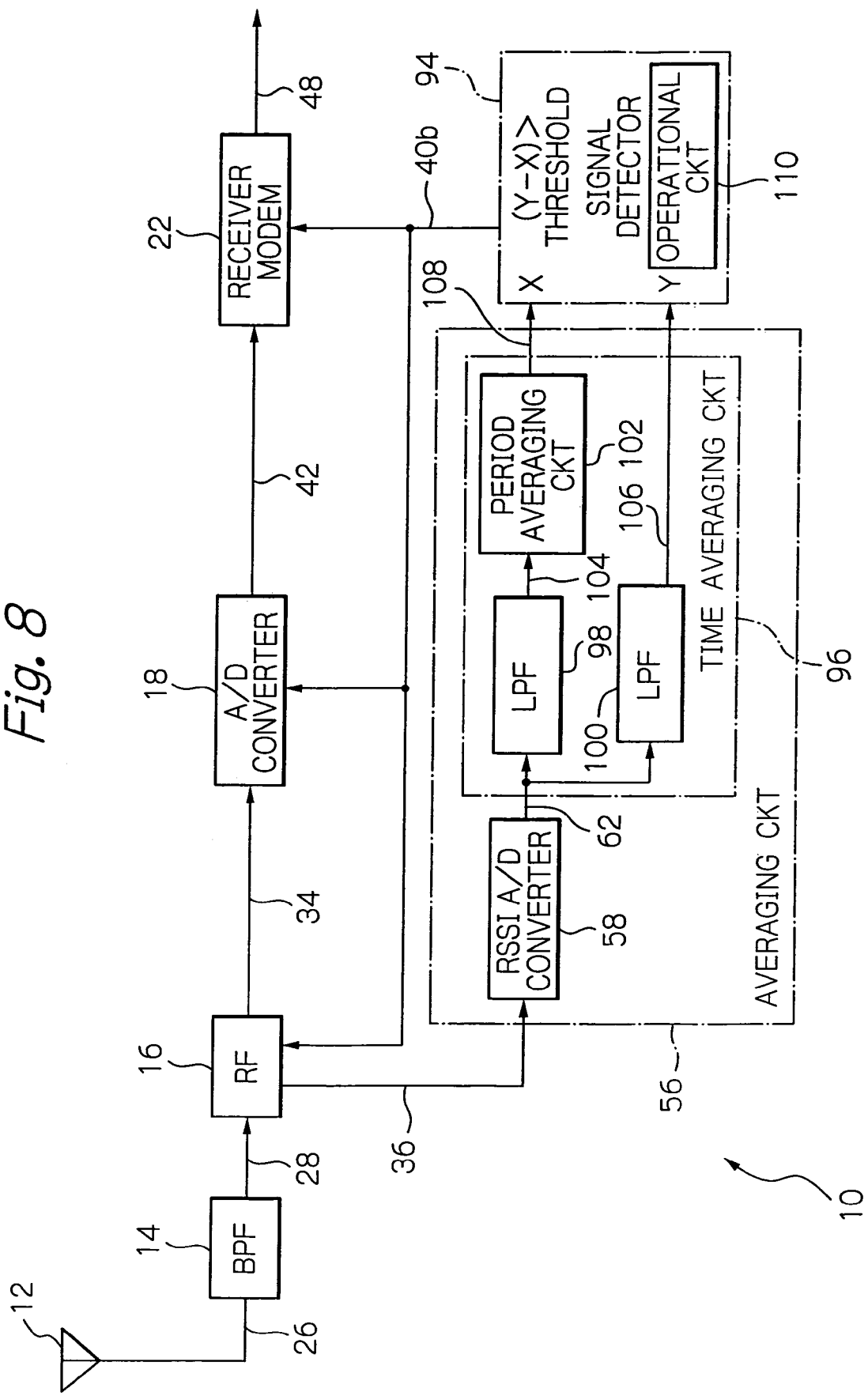
FIG. 8 is a block diagram, like FIG. 1, showing a schematic configuration of another alternative embodiment of a modem to which the data receiver of the invention is applied.

In the following, a still other embodiment of the modem 10 will be described to which the data receiver is applied in accordance with the invention with reference to FIG. 8. The modem 10 of this embodiment is characterized in that the averaging circuit 56 and a signal detector 94 are arranged as shown in FIG. 8. The averaging circuit 56 includes an RSSI A/D converter 58 and a time averaging circuit 96. The time averaging circuit 96 includes low-pass filters 98 and 100, and a period averaging circuit 102. In the modem 10 of the illustrative embodiment, averaging is calculated with respect to averaging parameters, such as period or frequency of the RSSI signal 36 or a unit time. The low-pass filter 100 is faster in signal detection characteristic of the RSSI signal 36 than the low-pass filter 98. The low-pass filter 98 feeds the period averaging circuit 102 with data 104 resultant from its low-pass filtering. The period averaging circuit 102 receives the data 106 at a predetermined time interval, and averages the input data 106 to output data 108 resultant from the averaging to the signal detector 94.

The signal detector 94 includes an operational circuit 110, and has the function of comparison against a fixed or predetermined threshold to output an enable signal 40b. The signal detector 94 uses the data X and Y received on its input ports 108 and 106, respectively to calculate a subtraction Y−X to obtain resultant data Z. The signal detector 94 compares the data Z with the fixed threshold value. The signal detector 94, whenever the data Z is larger than the fixed threshold value, produces the enable signal 40b to the RF section 16, the A/D converter 18 and the receiver modem 22.

The operation of the modem 10 of the present embodiment will be described in brief. The RSSI signal 36 is fed to the averaging circuit 56. The averaging circuit 56 passes the RSSI signal 36 to the A/D converter 58. The RSSI data 62, digitalized by the A/D converter 58, are fed to the low-pass filters 98 and 100. The low-pass filter 98 delivers the data 104 to the period averaging circuit 102 at the predetermined interval. The low-pass filter 100 is, as described above, faster in signal detection time of input signals than the low-pass filter 98.

Noise is generally prevailing in the peripheral environment of the modem 10. Even in the case where the noise level fluctuates at a certain cycle, the data 104 are fed to the period averaging circuit 102 at the predetermined interval, and then the noise is averaged to output the data 108 in the form of noiseless floor level. The signal detector 94 determines, when a difference of the data 106 from the noise floor level is larger than the fixed threshold value set beforehand, that there is an intended signal, and outputs the enable signal 40b to start up the A/D converter 18 and the receiver modem 22. The signal detector 94 constantly confirms the data Z from the data (X−Y). In other words, when the data 106 (Y) are larger than the value resultant from the addition of the threshold value set beforehand to the data 108 (Y), it is judged that there is an intended signal, and then the enable signal 40b is outputted.

If the system were merely structured such as to determine an intended signal detected when the RSSI signal 36 is detected larger than the fixed threshold value preset, the peripheral environment would, when getting worse, have caused erroneous detection to increase in the signal detector 94. With the illustrative embodiment configured in the way described above, however, the period averaging circuit 102 is provided so as to usually measure the level of the peripheral environment by the signal detector 94, thus enabling a correct signal detection upon receiving an intended signal having its level large to a certain extent with respect to the noise floor level.

The modem 10 shown in FIG. 8 has the RF section 16 producing the RSSI signal 36 and the baseband signal converted from the received signal 34, and the averaging circuit 56 digitalizing the RSSI signal and averaging the RSSI data 62 to feed the latter to the signal detector 94. When the signal detector 94 determines the RSSI data (Y−X) higher than the reference level, it outputs enable signal 40b as a control signal to the RF section 16, the A/D converter 18 and the demodulator 46 of the receiver modem 22, thereby making it possible to avoid useless operation to reduce the electric power consumption in the system and to accomplish the correct signal detection.

The signal detector 94 has the operating circuit 110 executing its operation on the basis of the averaged data 104 (X) and 106(Y). The signal detector 94 compares the operated result (Y−X) with the reference value set beforehand to then generate the enable signal 40a, thereby making it possible to increase the accuracy in signal detection.

Figure 9:
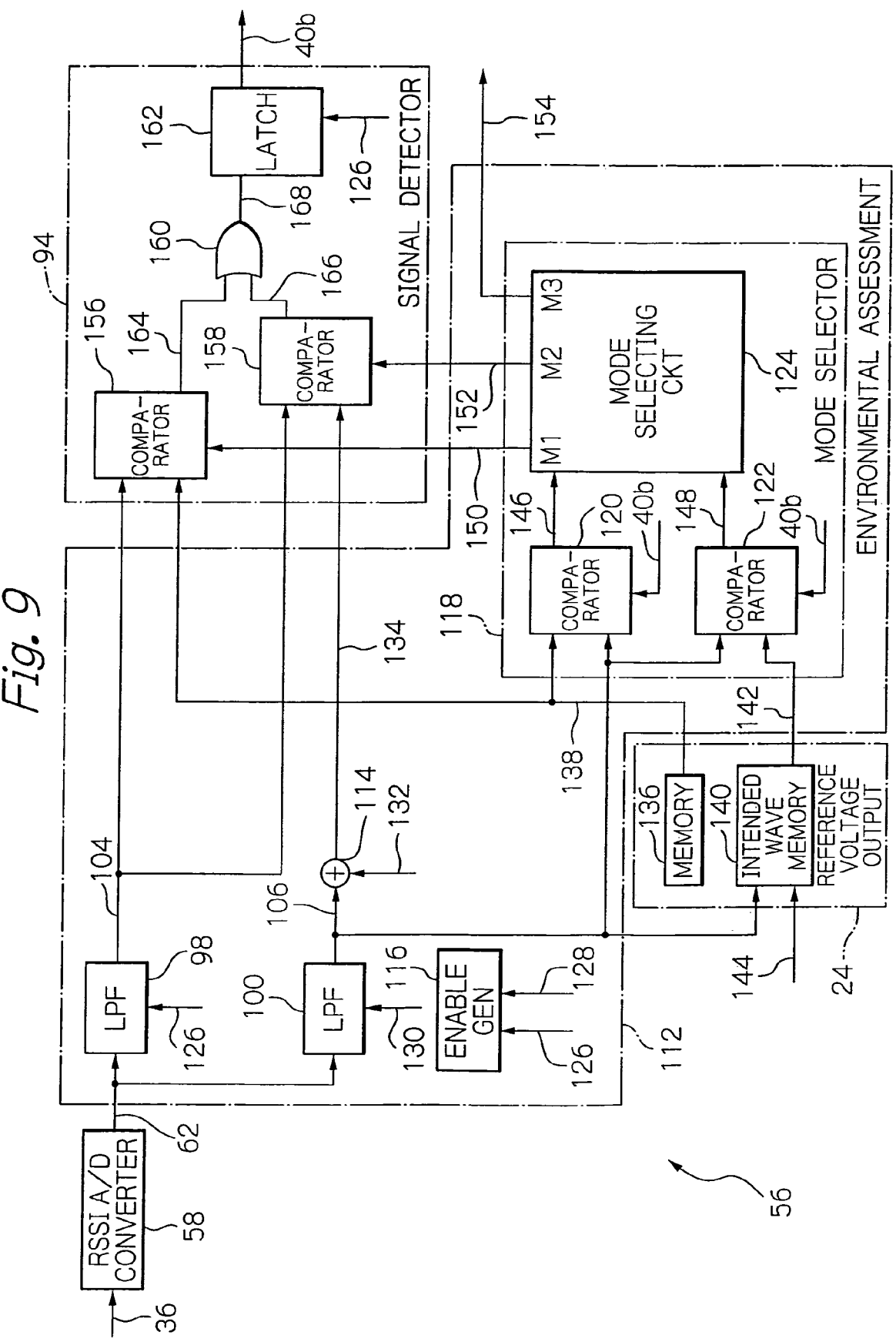
FIG. 9 is a block diagram showing an alternative configuration of averaging circuitry and a signal detector in the modem shown in FIG. 8.

The averaging circuit 56 may be configured as shown in FIG. 9. The averaging circuit 56 shown in the figure is adapted to feed the processed data to the signal detector 94 to output the enable signal 40b. The averaging circuit 56 includes an RSSI converter 58 and an environmental assessment section 112. The environmental assessment section 112 includes the low-pass filters 99 and 100, an adder 114, an enable generator 116 and a mode selector 118, which are interconnected as shown. Further, the mode selector 118 comprises comparators 120 and 122 and a mode selecting circuit 124 interconnected as depicted.

The low-pass filter 98 is adapted to reset itself in response to a release signal 126 and be rendered operative in response to the signals other than that. The release signal 126 is provided on the basis of error information from a MAC (Media Access Control) layer/a PHY (PHYsical) layer and data end information from the MAC layer. The one low-pass filter 98 feeds the filtered-out data 104 to the signal detector 94. The other low-pass filter 100 is operated in response to a sync-established signal 128 serving as its enable signal, and feeds the filtered-out data 106 to one input port of the adder 114. The adder 114 receives a predetermined value 132 on its other input port. The predetermined value 132 takes a value corresponding to an initial value set beforehand as an RSSI threshold value. The adder 114 outputs the data 134 resulting from the addition to the signal detector 94. The data 106 outputted from the low-pass filter 100 is fed to the mode selector 118 and the reference voltage output section 24 as well.

The enable generator 116 releases its operation in response to the release signal 126, and outputs, upon receipt of a sync detection signal outputted in a mode M3, which will be described later, an enable signal 130 to the low-pass filter 100 to activate the filter 100. By the operation at the timing thus described, a long integration time is set for the low-pass filter 100.

In the mode selector 118, the comparator 120 has its one input port fed with a threshold value 138 stored in a memory 136 of the reference voltage output section 24, and its other input port fed with the data 106. Also, the comparator 122 has its one input port fed with a level value 140 stored in an intended wave memory 140 of the reference voltage output section 24, and its other input port fed with the data 106. To and from the intended wave memory 140, data 106 are written in and read out in response to an enable signal 144, which is provided from the MAC layer when a signal expected is correctly obtained in the MAC layer, not shown, so as to decide that an intended signal level is provided.

The one comparator 120 is adapted to output, when the supplied data 106 are larger than the threshold 138, a signal 146 to one input port of the mode selecting circuit 124. The other comparator 122 is adapted to output, when the supplied data 106 are larger than the level 142, a signal 148 to the other input port of the mode selecting circuit 124. The comparators 120 and 122 are rendered operative when primed with the enable signal 40b.

The mode selecting circuit 124 is responsive, when not receiving the signal 146 on its one input port, to the mode M1 upon the signal detection for the RSSI signal 36 to feed an enable signal 150 to the signal detector 94. The mode selecting circuit 124, while receiving the signal 146 on its one input port, shifts its mode from the mode M1 to the mode M2 in the signal detection for the RSSI signal 36. The mode selecting circuit 124 feeds, upon shifting to the mode M2, an enable signal 152 to the signal detector 94. Further, the mode selecting circuit 124, when receiving the signal 148 on its one input port, changes its mode in the signal detection for the RSSI signal 36 from the mode M2 to the mode M3. The mode selecting circuit 124 feeds, upon shifting to the mode M3, the sync detection signal 154 to a sync detector, not shown. The sync detector is a utility circuit adapted to always detect synchronization.

The signal detector 94 includes the comparators 156 and 158, a logical adder 160 and a latch 162, which are interconnected as shown. Fed to the one comparator 156 are the data 104 and the threshold value 138. The comparator 156 is adapted to compare the data 104 with the threshold value 138 in response to the enable signal 150 supplied. The comparator 156 outputs a signal detection signal 164, when the data 104 are larger than the threshold value 138. Also, fed to the other comparator 158 are the data 104 and data 134. The comparator 158 is adapted to compare the data 104 with the data 134 in response to the enable signal 152. The comparator 158 outputs a signal detection signal 166, when the data 104 are larger than the data 134. The logical adder, or OR gate, 160 is fed with the signal detection signals 164 and 166 to deliver, in both modes M1 and M2, a signal detection signal 168 to the latch 162. The latch 162 is adapted to receive the signal detection signal 168 in response to the positive-going edge of a clock signal, not shown, to output it as an enable signal 40*b* indicating the signal detection. The latch 162 is reset in response to the release signal 126 supplied.

Subsequently, the operation of the averaging circuit 56 and the signal detector 94 in the modem 10 in accordance with the invention will be described in brief. The operation is intended to propose a method of changing the signal detection according to environmental conditions. When the system is not in a noisy environment, the comparator 156 compares the data 104 from the low-pass filter 98 with the threshold value 138, and it is recognized, if the data 104 are higher in level than the threshold value 138, that there exists an expected signal to output the signal detection signal 164.

The low-pass filter 100 is set with its longer integration time to recognize the peripheral environment. The data 106 are measured in an interval where no expected signal exists. The comparator 120 outputs, when the data 106 are higher in level than the threshold value 138, the signal 146 to the mode selecting circuit 124. The mode selecting circuit 124 changes its mode in the signal detection for the RSSI signal from the mode M1 to the mode M2, and outputs the enable signal 152 to the comparator 158. The comparator 158, when the data 104 are larger than the data 134, recognizes that an expected signal is fed thereto, and then outputs the signal detection signal 166 indicating its ON or significant state.

Further, when the expected signal is correctly obtained in the MAC layer and the enable signal 144 is fed to the intended wave memory 140, the level data 142 and the data 106 are fed from the intended wave memory 140 and the low-pass filter 100 to the comparator 122, respectively. When the data 106 are larger than the level 142, then the comparator 122 outputs the signal 148 to the mode selector 124. The mode selector 124 in turn changes its mode from the mode M2 to the mode M3, and output the sync detection signal 154 to a sync detector, not shown. The sync detector constantly detects synchronization. It is to be noted that the intended wave memory 140 may be adapted to forcibly set itself to the MAX level so as not to switch to the mode M3.

Changing the signal detecting method according to the environmental condition in this way with the illustrative embodiment can reduce power consumption of the circuits.

Here, the comparison will be made of the two embodiments described above with Japanese patent laid-open publication No. 163949/1998 indicated earlier. The burst signal demodulator disclosed in the '949 publication measures the energy of the peripheral environment. In the burst signal demodulator of the '949 publication, however, differs in time of measuring the environmental energy in such a way that the demodulator analyzes the header of a unique word to determine the time inserted in the header, stops the processing at the analyzed time, and then measures the energy the peripheral environment. In the illustrative embodiments, the processing halts from the time of a synchronization established to the time of information received such as error information on a MAC and PHY or the end-of-data information received from a MAC, and in the remaining time period energy is measured in the peripheral environment. Determination on a MAC of a received radio signal improves the reliability of the signal, thereby making it possible to avoid erroneous recognition. By contrast, the demodulator disclosed in the '949 publication analyzes a unique word so as to often cause a signal directed to another destination to be erroneously recognized as a signal destined to itself.

The averaging circuit includes the environment assessment section 112 for selecting a mode in which the signal detector operates according to the conditions in the peripheral environment, thereby making it possible to comply with the worsened peripheral environment.

In the environment assessment section 112, the enable generator 116 feeds the enable signal 130 to the low-pass filter 100, and the low-pass filters 98 and 100 low-pass filter the RSSI data 62. The adder 114 has its one input port interconnected to the output port of the low-pass filter 100 and its other input port interconnected to receive the predetermined level 132. The mode selector 118 compares the data 106 with a plurality of reference levels 138 and 142 to be fed thereto, and selects a mode in which the signal detector 94 operates according to the result of the comparison, thereby making it possible to reduce power consumption as well as to correctly output received data according to the environment.

The signal detector 94 outputs the signal detection signal 164 when the comparator 156 determines that the data 104 are larger than the fixed threshold value, and the signal detection signal 166 when the comparator 158 determines that the data 104 are larger than the data 134. The logical adder 160 develops the signal detection signal 168 in response to the truth state of the determination made by either of the comparators 156 and 158. The signal detection signal 168 passes the latch 162 to output the enable signal 40*b*, thereby making it possible to further increase the accuracy in signal detection according to the environmental conditions.

Figure 10:
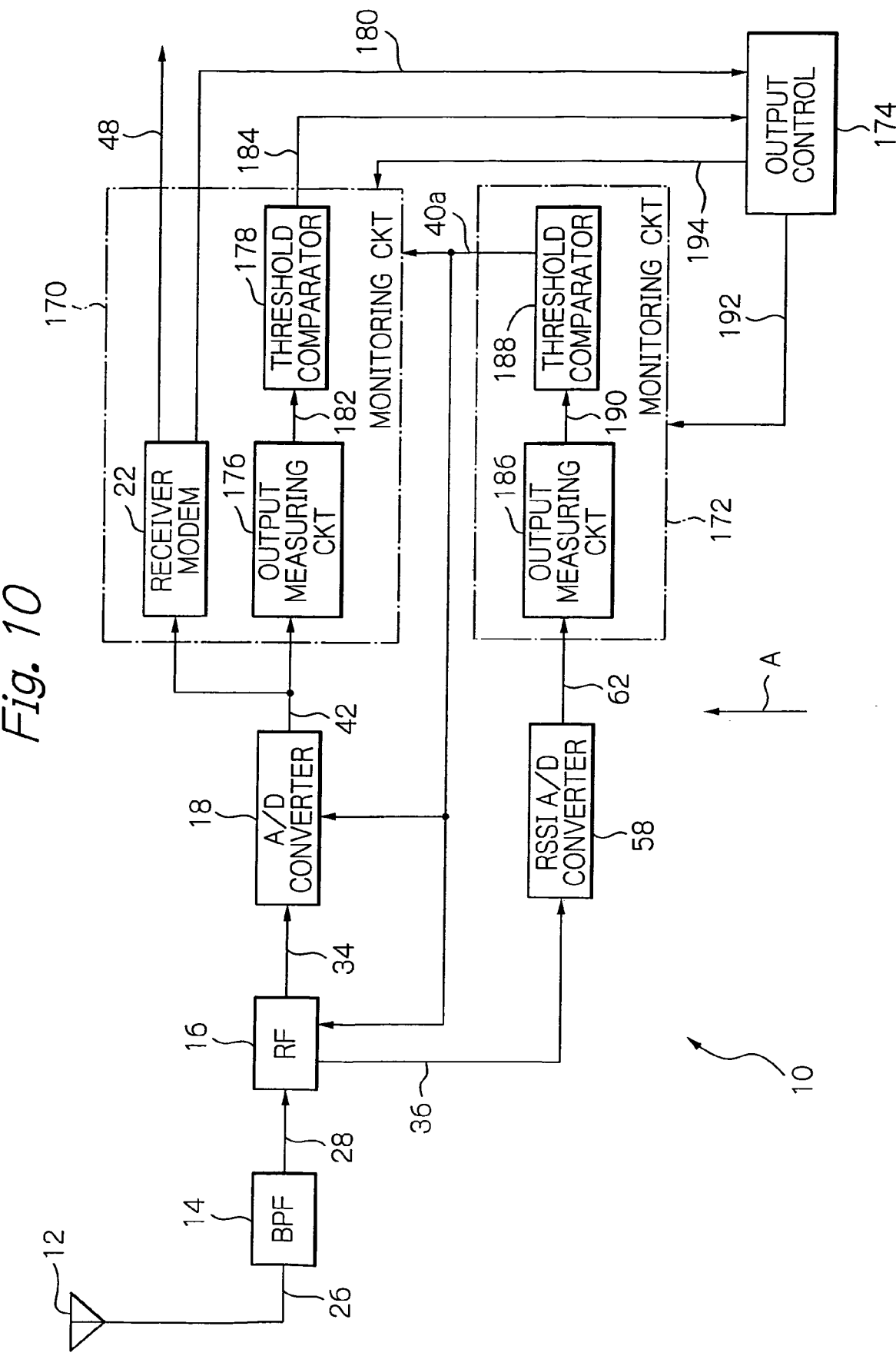
FIG. 10 is a block diagram, like FIG. 1, showing a schematic configuration of a still other embodiment of a modem to which the data receiver of the invention is applied.

Now referring to FIG. 10, a further alternative embodiment of the modem 10 will be described to which the data receiver is applied in accordance with the invention. The modem 10 in the embodiment, as shown in FIG. 10, has monitoring circuits 170 and 172 and an output control 174 arranged in the stage following the position indicated with an arrow A following the A/D converter 18 for digitalization and the RSSI A/D converter 58.

The one monitoring circuit 170 includes the receiver modem 22, an output measuring circuit 176 and a threshold comparator 178. The receiver modem 22 has the function of outputting the demodulated data 48, as well as determining, not shown, that a transition is made to a level at which expected operation can be executed to output a flag signal 180. The receiver modem 22 feeds the flag signal 180 to the output control 174.

The output measuring circuit 176 has the function of measuring the power of the data 42 received thereby. The output measuring circuit 176 feeds the signal indicative of the measured power 182 to the threshold comparator 178. The threshold comparator 178 has the function of comparing the received power signal 178 with the predetermined fixed threshold value, and generating another flag signal 184 when the power 178 is higher than the fixed threshold value. The threshold comparator 178 outputs the generated flag signal 184 to the output control 174.

The other monitoring circuit 172 includes an output measuring circuit 186 and a threshold comparator 188. The output measuring circuit 186 and the threshold comparator 188 have the function basically the same as that of the afore-mentioned output measuring circuit 176 and threshold comparator 178, respectively. The output measuring circuit 176 receives the data from the RSSI A/D converter 58, and measures the power of the data 62 to output the power signal 190 representing the measured power to the threshold comparator 188. The threshold comparator 178 has the function of comparing the power signal 190 received with the fixed threshold value 188 set beforehand to produce, when the power signal 190 is larger than the fixed threshold value, the enable signal 40a. The threshold comparator 188 outputs the generated enable signal 40a to the A/D converter 18 and the monitoring circuit 170 to thereby control the operation thereof.

The output control 174 has the function of outputting enable signals 192 and 194 in response to the flag signals 180 and 184 provided thereto The more detailed operation will be described later.

Well, the operation of the instant embodiment will be described mainly focused upon the control by the output control 174. In a favorable state of the peripheral environment, the output control 174 turns the enable signal 192 on and outputs it, in response to which the monitoring circuit 172 is brought into its operative state for monitoring the RSSI signal 36. The monitoring circuit 172, when the threshold comparator 188 detects a signal having its level higher than the expected level, outputs the enable signal 40a to cause the received signal to be processed, which in turn causes the receiver modem 22 to output the flag signal 180 to the output control 174. In response, the output control 174 stops the output of, or turns off, the enable signal 192. In this state, the threshold comparator 178 does not operate.

When the peripheral environment worsens, an error is detected due to noise during the detection of a received signal executed by the monitoring circuit 172, and, thus, the expected operation is not performed. In this case, the output control 174 turns the enable signal 192 off and outputs the enable signal 194 to bring the monitoring circuit 170 in its ON state. Then, the receiver modem 22 of the monitoring circuit 170 detects a received signal. Simultaneously, in the monitoring circuit 170, the output measuring circuit 176 is rendered operative. When the other monitoring circuit 172 shifts itself to a level at which an expected operation is available, the one monitoring circuit 170 feeds the flag signal 180 to the output control 174, which in turn outputs the enable signal 192 in its ON state and resets the enable signal 194 to its OFF state.

The selective operation of a block operating in a noisy environment in this way can reduce the power consumption in the entire system as well as attains operation in which deterioration is not involved in the detection of received signals.

The modem 10 shown in FIG. 10 has the RF section 16 developing the RSSI signal 36 and the baseband signal converted from the received signal 34. The A/D converter 18 and the RSSI A/D converter 58 digitalize the baseband signal converted from the received signal 34 and the RSSI signal 36 to feed them to the monitoring circuits 170 and 172, respectively. The output control 174 controls the operation of the system in response to the flag signals 180 and 184 fed from the monitoring circuits 170 and 172, thereby making it possible to reduce power consumption in the entire system as well as to attain operation in which deterioration does not occur in the detection of received signals.

The entire disclosure of Japanese patent application No. 2004-9651 and 2004-296656 filed on Jan. 16 and Oct. 8, 2004, respectively, including the specifications, claims, accompanying drawings and abstracts of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A data receiver comprising:
   a frequency converter for receiving a radio frequency signal and converting the radio frequency signal received to a baseband signal;
   an RSSI (Received Signal Strength Indication) signal generator for outputting an RSSI signal indicating a received strength indication level of the radio frequency signal;
   a digitizer for digitalizing the baseband signal to output data;
   a receiver demodulator for demodulating the data to output a demodulated signal;
   a comparator for comparing a level of the RSSI signal with a reference level to output a control signal for controlling operation according to a result from comparison to said frequency converter said digitizer and said receiver demodulator; and
   an adjusting circuit operative in response to the demodulated signal for adjusting the reference level;
   wherein said adjusting circuit is provided with a set value for comparison, calculates a difference of the reference level currently set with the set value for comparison, and operates the difference calculated on a basis of the demodulated signal to produce a new reference level.

2. The data receiver in accordance with claim 1, further comprising an averaging circuit provided between said frequency converter and said comparator for averaging the RSSI signal.

3. The data receiver in accordance with claim 1, further comprising:
   a selector provided between said frequency converter and said digitizer for selecting either one of the baseband signal and the RSSI signal; and
   an averaging circuit for averaging the data output from said digitizer,
   said comparator controlling said selector.

4. The data receiver in accordance with claim 1, further comprising:
   an RSSI processor operative in response to the RSSI signal from the comparator for outputting the control signal to said frequency converter, said digitizer and said receiver demodulator; and
   a level setting circuit for providing data for setting a level higher than the reference level,
   said comparator feeding the control signal to said RSSI processor to control starting-up or stopping said RSSI processor.

5. The data receiver in accordance with claim 1, further comprising:
   an averaging circuit for digitalizing and averaging the RSSI signal to produce average data;
   an information supply circuit for determining whether or not the demodulated signal is destined to said data receiver, and outputting a timing signal containing information of write permission when the demodulated signal is destined to said data receiver; and
   a memory operative in response to the timing signal for storing the average data, and discarding the stored average data in response to the timing signal not including the information of write permission.

6. A data receiver comprising:
a frequency converter for receiving a radio frequency signal and converting the radio frequency signal received to a baseband signal;
an RSSI (Received Signal Strength Indication) signal generator for outputting an RSSI signal indicating a received strength indication level of the radio frequency signal;
a digitizer for digitalizing the baseband signal to output data;
a receiver demodulator for demodulating the data to output a demodulated signal;
an averaging circuit for digitalizing the RSSI signal and averaging the RSSI signal digitalized with each of a plurality of averaging parameters to produce a corresponding plurality of average data; and
a signal detector for comparing each of the plurality of average data with a predetermined reference level in response to an error detection, and producing a control signal for operation according to a result of comparison to said frequency converter, said digitizer and said receiver demodulator.

7. The data receiver in accordance with claim 6, wherein said signal detector comprises an operating circuit for executing operating on each of the average data, and compares a result of the operation with the predetermined reference level to produce the control signal.

8. The data receiver in accordance with claim 6, wherein said averaging circuit comprises an environment assessing circuit for selecting a mode in which said signal detector operates according to a condition of peripheral environment.

9. The data receiver in accordance with claim 8, wherein said environment assessing circuit comprises:
a first filter for low-pass filtering the RSSI signal digitalized;
a second filter for low-pass filtering the RSSI signal digitalized;
an adder having one input port connected to an output of said second filter and another input port receiving a predetermined level;
a permission signal generator for feeding said second filter with a permission signal permitting said second filter to operate; and
a mode selector for comparing an output from said second filter with a plurality of reference levels fed thereto to select a mode in which said signal detector operates according to a result of comparison.

10. The data receiver in accordance with claim 9, wherein said signal detector comprises:
a first mode determining circuit for determining whether or not an output from said first filter is larger than a predetermined threshold value;
a second mode determining circuit for determining whether or not the output from said first filter is larger than an output from said adder;
a logical adder for outputting a logical add of a signal detection signal outputted when determination made by said first and second mode determining circuits is positive; and
a holding circuit for latching the signal detection signal.

11. A data receiver comprising:
a frequency converter for receiving a radio frequency signal and converting the radio frequency signal received to a baseband signal;
an RSSI (Received Signal Strength Indication) signal generator for outputting an RSSI signal indicating a received strength indication level of the radio frequency signal;
a first convener for digitalizing the baseband signal to output digitized baseband data;
a second converter for digitalizing the RSSI signal produced to output RSSI data;
a receiver demodulator for demodulating the baseband data to output a demodulated signal;
a first monitoring circuit for demodulating the digitized baseband data, and monitoring a favorable peripheral environment on a basis of the digitized baseband data;
a second monitoring circuit for monitoring deterioration of the peripheral environment on a basis of the RSSI data to control operations of said frequency converter, said first converter and said first monitoring circuit; and
an output control circuit operative in response to said first and second monitoring circuits for producing a permission signal of operation to control operation of said first and second monitoring circuits.

* * * * *